United States Patent
Johanson et al.

(10) Patent No.: US 6,912,716 B1
(45) Date of Patent: Jun. 28, 2005

(54) MAXIMIZED DATA SPACE IN SHARED MEMORY BETWEEN PROCESSORS

(75) Inventors: James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/434,299

(22) Filed: Nov. 5, 1999

(51) Int. Cl.[7] ............................................. G06F 9/46
(52) U.S. Cl. .................. 719/312; 711/147; 711/148; 711/149; 709/214; 709/215; 709/216
(58) Field of Search ................. 709/214–216; 710/56; 711/147–153; 719/312–314

(56) References Cited

U.S. PATENT DOCUMENTS

| | | | |
|---|---|---|---|
| 3,924,245 A * | 12/1975 | Easton et al. ................ | 711/219 |
| 5,414,826 A * | 5/1995 | Garcia ......................... | 711/101 |
| 5,537,576 A * | 7/1996 | Perets et al. ................. | 711/150 |
| 5,566,321 A * | 10/1996 | Pase et al. ................... | 711/153 |
| 5,608,873 A * | 3/1997 | Feemster et al. ............ | 709/214 |
| 5,802,351 A * | 9/1998 | Frampton .................... | 710/56 |

* cited by examiner

*Primary Examiner*—Meng-Al T. An
*Assistant Examiner*—Charles Anya

(57) ABSTRACT

A technique and apparatus for efficiently and flexibly utilizing shared memory as a full duplex mailbox for both data and payload information. The invention allows payload messages of varying lengths to be passed in contiguous memory space, allowing an interrupt service routine (ISR) or other process to easily and quickly read or cache the passed payload data. In a disclosed embodiment, a processor-to-processor mailbox is formed using a shared memory (e.g., a dual port RAM). The shared memory is separated into three main portions: a processor 1 to processor 2 fixed portion, a processor 2 to processor 1 fixed portion, and an unallocated dynamic portion. Importantly, the other direction of the mailbox is located starting at the highest address of the shared memory, and works toward the lowest address of the shared memory. Preferably, write access for payload messages and other generally longer messages are dynamically allocated in the unallocated dynamic portion for use in either mailbox. For messages passed in mailbox 1, i.e., from processor 1 to processor 2, the memory in the unallocated dynamic portion is allocated in a lowest to highest address direction. Conversely, for messages passed in mailbox 2, i.e., from processor 2 to processor 1, the memory in the unallocated dynamic portion is allocated in a highest to lowest address direction.

15 Claims, 5 Drawing Sheets

MAXIMIZED DATA SPACE IN SHARED MEMORY BETWEEN PROCESSORS

BACKGROUND OF THE INVENTION

1. Field of the Invention

The present invention relates to use of shared memory between multiple processors for communicating command messages and payload data therebetween. More particularly, it relates to an efficient architecture and system design for efficiently assigning shared memory locations as a full duplex mailbox.

2. Background of Related Art

Digital memory is found in nearly every digital electronic device, particularly when such device includes a processor (e.g., a microprocessor, microcontroller, or digital signal processor). Many types of digital memory exist, perhaps the most common form being random access memory (RAM).

With advancements in technology came the need to include more than one processor in a device. While each processor (or other) device has its own assigned tasks, information is typically made available to either processor through the use of a commonly accessible memory, e.g., RAM. This commonly accessible memory may be dual port memory or simply a shared memory area having an individual address and data bus (i.e., port) for each accessing processor.

Two processors (e.g., a microprocessor unit (MPU) and a digital signal processor (DSP)) may utilize shared memory to cooperatively pass command information to one another, and/or to pass more lengthy payload data (e.g., digitized voice messages) back and forth. Such a use of the shared memory is often referred to as a "shared mailbox" or simply a "mailbox".

In a shared memory mailbox, a first processor or other device writes to a particular address/data location(s) of the shared memory, and the second processor or other device reads from that particular address/data location(s).

FIG. 4 shows a conventional shared memory 504, e.g., a dual port memory, serving as a message mailbox between two processors. In FIG. 4, the shared memory 504 has a first port 579 including an address and data bus connected to a first processor 500, and a second port 589 including another address and data bus connected to a second processor 502.

Depending upon the particular application, an incoming mailbox and an outgoing mailbox for a particular processor may be of different sizes. For instance, in FIG. 4, the shared memory 504 is configured for use by either processor 500, 502 by providing a moveable partition in the memory space of the common memory 504. For instance, if the common memory 504 is a 2K word memory, the first 1K (i.e., 0 to 1K) may be assigned for use by the first processor 500 while the second 1K (i.e., 1K to 2K) may be assigned for use by the second processor 502. The partitioned portions of the shared memory are mapped into the memory map of the respective processors, and form the boundaries of the two mailboxes providing bi-directional messaging between the two processors 500, 502.

The challenges of using a dual access RAM or other shared memory 504 to pass messages between processors 500, 502 are well known. For instance, use of the shared, common memory 504 as a message mailbox between the two processors 500, 502, requires that both processors 500, 502 have access to common memory locations. To pass messages from the first processor 500 to the second processor 502, the first processor 500 must be given write access to that particular memory location, and the second processor 502 must be given read access to read that same memory location to receive the message.

As shown in FIG. 5, from an external perspective, it appears as if either processor 500, 502 can access any memory location 530–545 in the shared memory 504 at any time. For instance, in the example shown in FIG. 5, the first processor 500 is addressing memory location 535, and the memory location 535 is allowing an appropriate write operation (or other operation) on the first data bus DATA 1 corresponding to the first processor 500. At the same time, the second processor 502 is accessing memory location 542 using its corresponding address and data buses ADDR 2, DATA 2.

The example of FIG. 5 shows proper simultaneous access to separate and distinct memory locations 535 and 542 by the respective processors 500, 502 using conventional dual port memory 504. However, as shown in the example of FIG. 6, a collision would occur in the event that both processors 500, 502 try to simultaneously write to the same memory location 542. In this case, an unpredictable state would occur with respect to data output on the respective data buses DATA 1, DATA 2.

Conflicts may occur between the two processors 500, 502, e.g., if an access from either processor 500, 502 to any particular memory location is overlapped with an access by the other. Thus, designers attempt to avoid race conditions and corruption of data caused by the potential for simultaneous or substantially simultaneous access of a particular memory location by both processors 500, 502.

To avoid overwriting or otherwise colliding with each other's data space, the shared memory 504 can be physically or logically separated into two mailbox segments. This technique works, but is not flexible enough to efficiently accommodate large payload data transfers from either processor to the other without requiring reconfiguring of the partition in the shared memory 504 between the mailbox message directions.

Another conventional method provides for dynamic allocation of the shared memory space 504 to only one processor at a time to avoid collisions (i.e., multiplexed access), but this technique does not maximize use of the shared data space, slows down full duplex (i.e., bi-directional) message transfer, and causes some longer payload messages to be passed in non-contiguous portions of the shared memory 504 which also slows down data transfer of the payload data from the shared memory 504 by the receiving processor.

Another technique to prevent collisions in accesses to common memory is to synchronize the accesses of the two processors 500, 502 to be not coincidental in time with one another, e.g., allowing alternating access on a word or other basis by the two processors 500, 502 to the shared memory 504. However, this technique slows down the data or payload transfer rate in both directions.

There is a need for an efficient technique and apparatus for using shared memory to form a bi-directional mailbox for command messages and/or payload data between two processors.

SUMMARY OF THE INVENTION

In accordance with the principles of the present invention, a shared memory processor-to-processor mailbox between at least two processors comprises a shared memory accessible by a first processor and a second processor. The shared memory includes a first mailbox portion to pass data from the first processor to the second processor, and a second mailbox portion to pass data from the second processor to the first processor. The first mailbox portion starts at a low physical address end of the shared memory, and fills upward toward a high physical address of the shared memory. The second mailbox portion starts at the high physical address end of the shared memory, and fills downward toward the low physical address of the shared memory. The first processor has write access to the first mailbox portion and not to the second mailbox portion.

A method of utilizing a shared memory as a mailbox between two processors in accordance with another aspect of the present invention comprises allocating first direction messages passed from a first processor to a second processor to a first physical address end of the shared memory. Second direction messages passed from the second processor to the first processor are allocated to a second physical address end of the shared memory opposite the first physical address end. The first direction messages are allowed to utilize a dynamically allocated central portion of the shared memory growing toward the second physical address end. The second direction messages are allowed to utilize the dynamically allocated central portion of the shared memory growing toward the first physical address end.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

This invention provides a technique and apparatus for efficiently and flexibly utilizing shared memory as a full duplex mailbox for both data and payload information. The invention allows payload messages of varying lengths to be passed in contiguous memory space, allowing an interrupt service routine (ISR) or other process to easily and quickly read or cache the passed payload data.

Figure 1A:
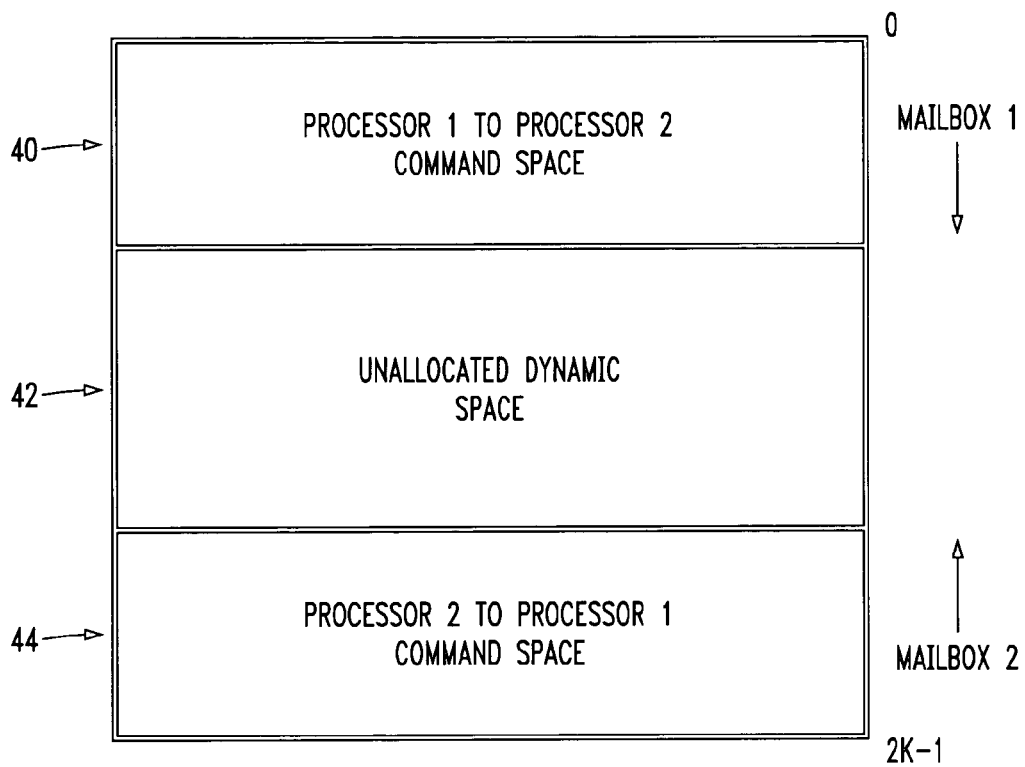
FIG. 1A shows a shared memory having an exemplary assignment of memory locations forming a bi-directional mailbox between two processors, in accordance with the principles of a first embodiment of the present invention.

FIG. 1A shows a shared memory having an exemplary assignment of memory locations forming a bi-directional mailbox between two processors, in accordance with the principles of a first embodiment of the present invention.

In FIG. 1, a processor-to-processor mailbox 100 is formed using a shared memory (e.g., a dual port RAM). The shared memory is separated into three main portions: a processor 1 to processor 2 fixed portion 40, a processor 2 to processor 1 fixed portion 44, and an unallocated dynamic portion 42.

The processor 1 to processor 2 fixed portion 40 may be used for passing commands or other messages and/or payload data from a first processor to a second processor. Ideally, the processor 1 to processor 2 fixed portion 40 remains available for short, normal command messages in the direction from the first processor to the second processor.

Importantly, the other direction of the mailbox is located starting at the highest address of the shared memory, and working toward the lowest address of the shared memory. In particular, the processor 2 to processor 1 fixed portion 44 may be used for passing commands or other messages and/or payload data from the second processor to the first processor. Ideally, the processor 2 to processor 1 fixed portion 44 remains available for short, normal command messages in the direction from the first processor to the second processor.

Preferably, payload messages and other generally longer messages are dynamically allocated in the unallocated dynamic portion 42 for use by both processors. For messages passed in mailbox 1, i.e., from processor 1 to processor 2, the memory in the unallocated dynamic portion 42 is allocated in a lowest to highest address direction. Conversely, for messages passed in mailbox 2, i.e., from processor 2 to processor 1, the memory in the unallocated dynamic portion 42 is allocated in a highest to lowest address direction.

Ideally, the total size of the shared memory is sized so as to statistically accommodate the maximum total length requirements of both mailboxes 1, 2. Use of the unallocated dynamic portion 42 may or may not be regulated as between the two processors. For instance, the particular application may accommodate the statistical improbability that the unallocated dynamic portion 42 will be overrun by messages in a particular direction (e.g., in certain voice applications). However, allocation (and therefore write access) to a used portion of the unallocated dynamic may be prevented until the buffered message is read by the appropriate processor.

Figure 1B:
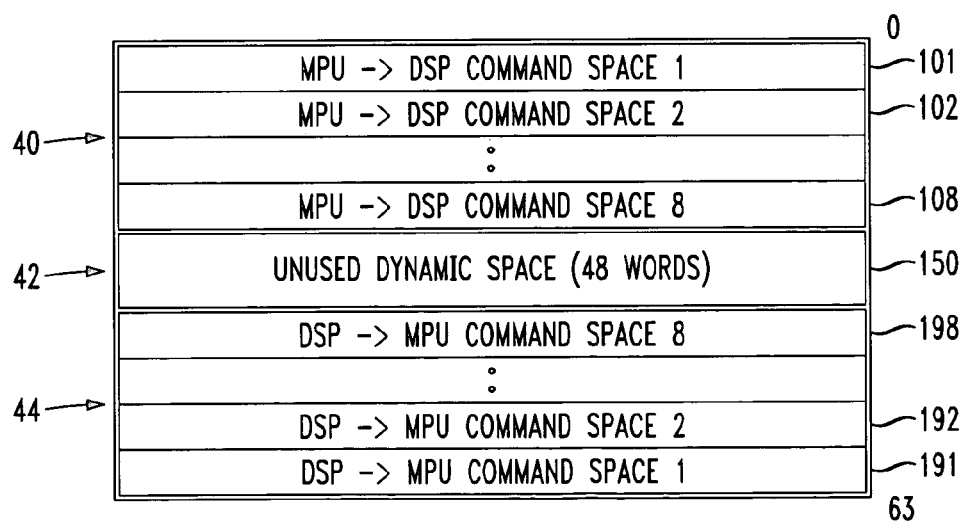
FIG. 1B is a more detailed depiction of the allocation and assignment of the shared memory shown in FIG. 1A.

FIG. 1B is a more detailed depiction of the allocation and assignment of the shared memory shown in FIG. 1A.

In particular, FIG. 1B depicts the shared memory having a total length of 64 words. Of course, the principles of the present invention relate equally to shared memory of any size, e.g., much smaller or much larger than 64 words.

In FIG. 1B, the processor-to-processor mailbox 100 comprises an MPU to DSP command portion 40, a DSP to MPU command portion 44, and an unused dynamically allocated portion 42. In the given example, the MPU to DSP portion 40 is allocated to be a minimum of eight (8) words in length starting at address 0 and filling up, and the DSP to MPU portion 44 is allocated to be a minimum of eight (8) words in length starting at address 63 and filling downwards. The unused dynamically allocated portion 42 utilizes the central portion of the shared memory, e.g., the central forty-eight (48) words.

In accordance with the principles of the present invention, a first processor (e.g., the MPU) accessing the shared memory of the bi-directional mailbox 100 is memory mapped to have write access to the shared memory from the beginning (e.g., from address zero (0)), and fills upwards toward the higher physical addresses of the shared memory, while the second processor (e.g., DSP) starts passing messages in the bi-directional mailbox 100 at the highest address of the shared memory (e.g., from address 2K-1 shown in FIG. 1B, and fills downwards toward the lower physical addresses of the shared memory. Thus, the second processor (e.g., DSP) write accesses the shared memory in reverse order beginning at the top of the shared memory (i.e., the highest address of the shared memory).

In the preferred embodiment, while although the first processor MPU has write access in an allocated direction starting at the bottom (e.g., 0 address) of the shared memory and filling upwards, and the second processor DSP has write access in an allocated direction starting at the top (e.g., 2K-1 address) of the shared memory and filling downwards, both processors MPU and DSP have read access to all or substantially all of the shared memory forming the processor-to-processor mailbox.

Preferably, each side of the shared memory (i.e., the processor 1 to processor 2 command space 40 and the processor 2 to processor 1 command space 44 has a defined minimum message size and memory location(s) reserved to allow all normal messages (e.g., command messages) to be passed no matter how much space in the shared memory the other side is allocated. In the embodiment shown in FIG. 1B the minimum message size is 1 word and the minimum number of message locations reserved are a total of eight (8).

If a larger amount of space in the processor-to-processor mailbox 100 is required by either processor to pass, e.g., a large payload data message, an appropriate command message can be first transmitted to the other processor to request (or demand) access to a sufficient amount of the shared memory to accomplish the desired task, and the other processor would refrain from utilizing that dynamically allocated portion 42 of the processor-to-processor mailbox 100.

Figure 2:
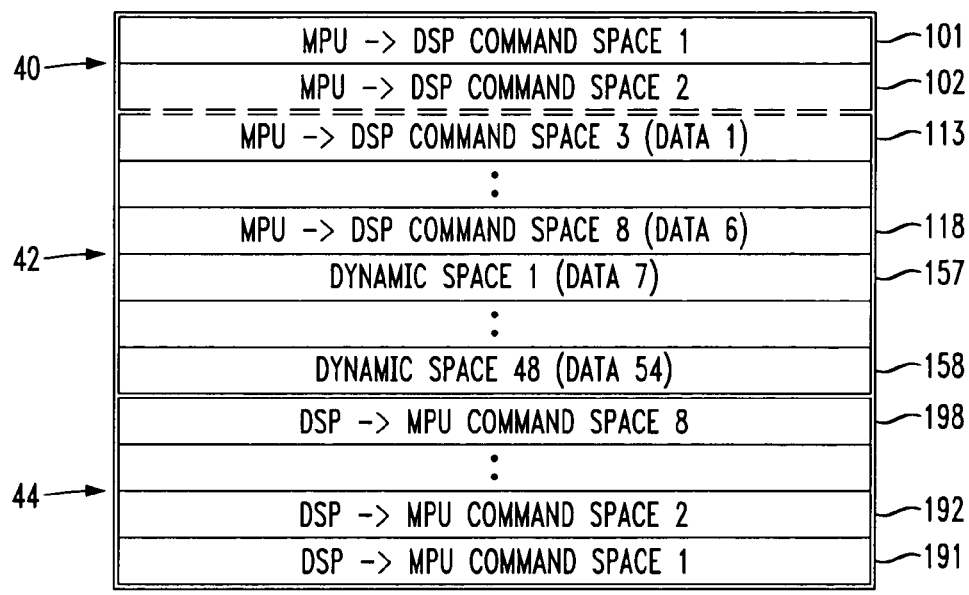
FIG. 2 shows an assignment of memory locations in a shared memory processor-to-processor mailbox in opposing directions as between two processors, including the example of dynamic allocation of buffer space between the two ends of the shared memory to the first processor, in accordance with the principles of a first embodiment of the present invention.

When one processor (e.g., the MPU) requires extra space in the shared memory for transmitting a large amount of data, it can maximize the allocation of shared memory, e.g., as shown in FIG. 2.

FIG. 2 shows an assignment of memory locations in a shared memory processor-to-processor mailbox in opposing directions as between two processors, including the example of dynamic allocation of buffer space between the two ends of the shared memory to the first processor, in accordance with the principles of a first embodiment of the present invention.

In particular, in FIG. 2, not only is all of the dynamically allocated space 42 allocated to the MPU for passing a data payload to the DSP, but a portion of the fixed command space 40 (e.g., the third through eighth command reservations 113–118) are also used for passage of the lengthy information from the first processor (e.g., MPU) to the second processor (e.g., DSP).

Figure 3:
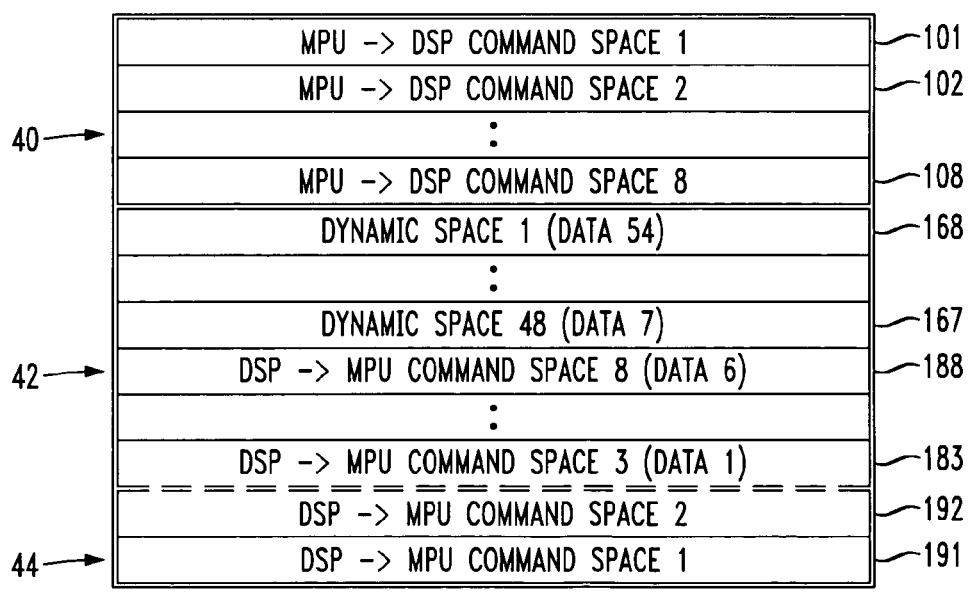
FIG. 3 shows an assignment of memory locations in a shared memory processor-to-processor mailbox in opposing directions as between two processors, including the example of dynamic allocation of buffer space between the two ends of the shared memory to the second processor, in accordance with the principles of a first embodiment of the present invention.
Figure 4:
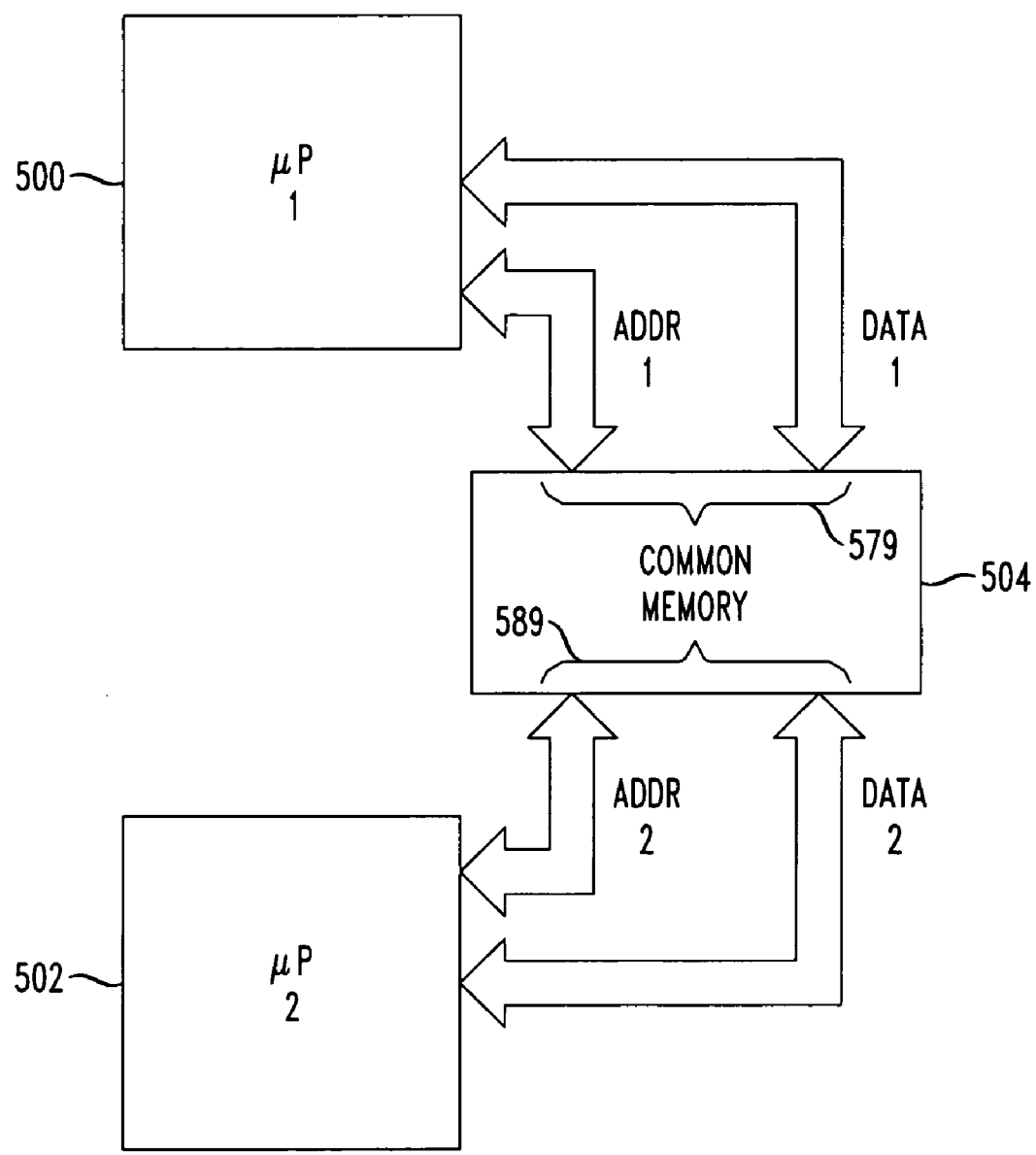
FIG. 4 shows a conventional dual port, common memory having first and second ports communicating with respective processors.
Figure 5:
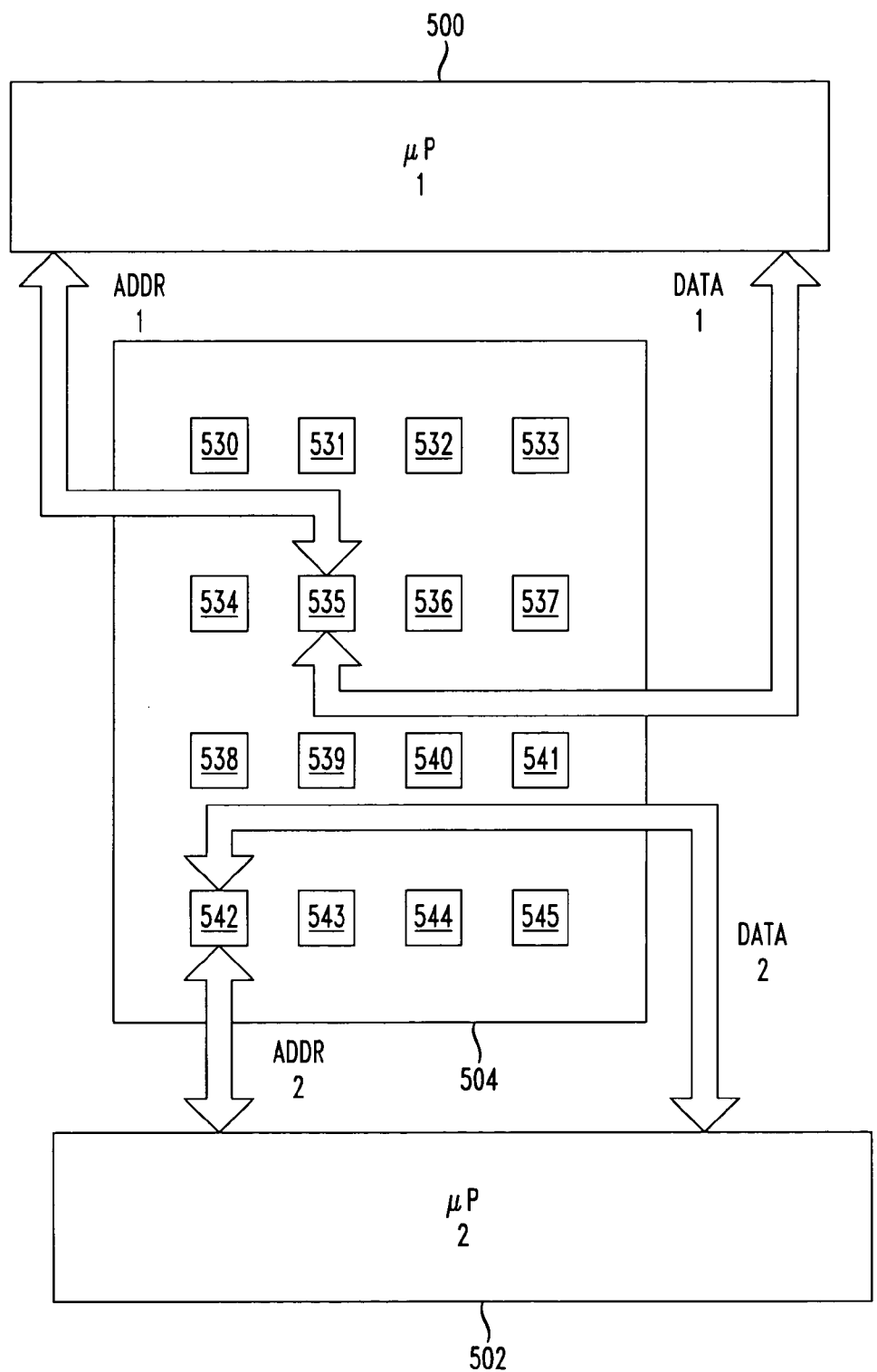
FIG. 5 depicts a conventional access to separate memory locations by two processors communicating with respective ports of a dual port, common memory.
Figure 6:
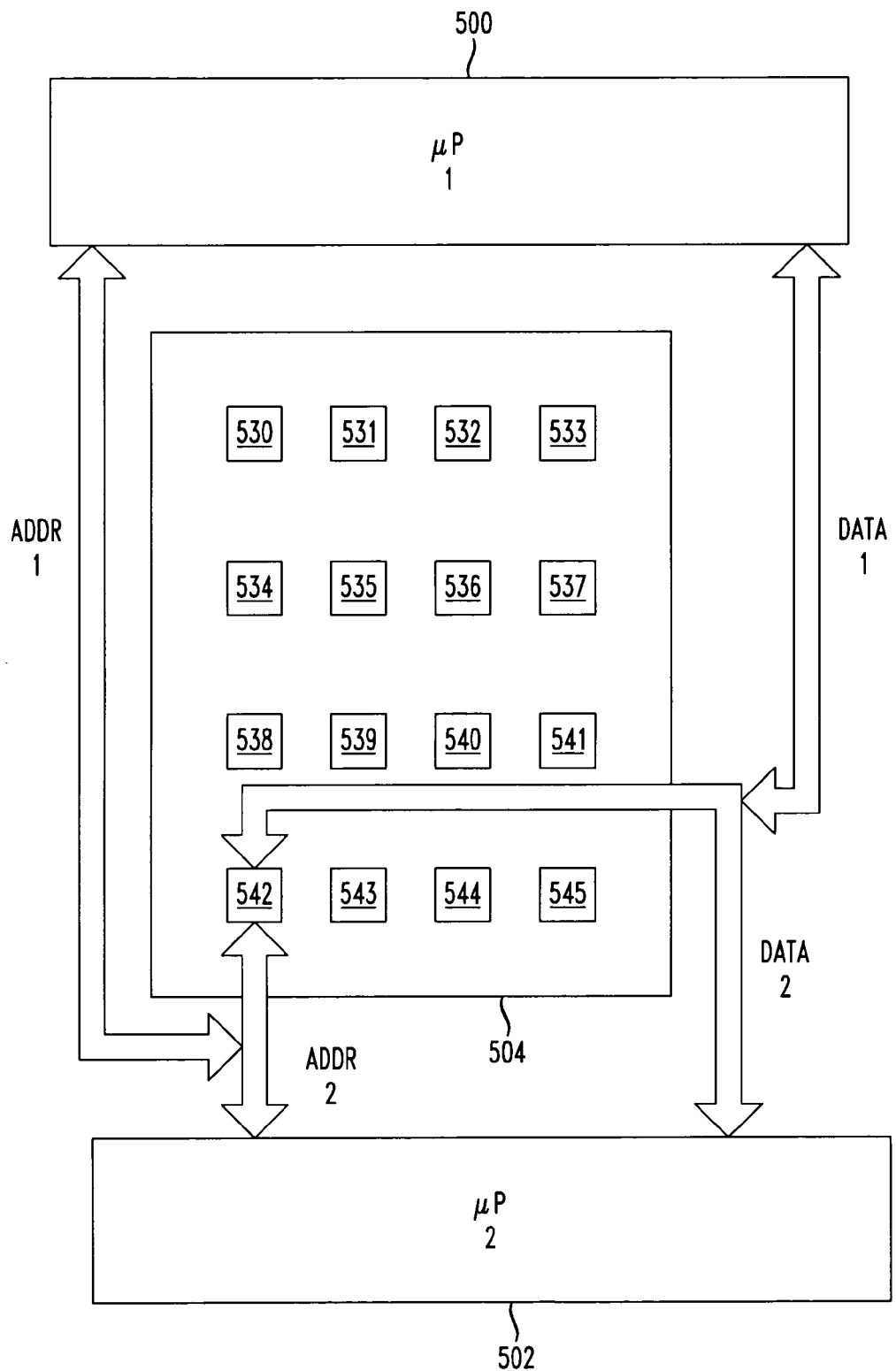
FIG. 6 shows a conventional access to the same memory location in a dual port, common memory resulting in a collision in accesses from two respective processors.

Conversely to FIG. 2, when the other processor (e.g., a DSP) serviced by the other side of the processor-to-processor mailbox 100 requires extra space to transmit a larger amount of data (either larger number of messages and/or a larger amount of payload data), it can maximize the shared memory, e.g., as shown in FIG. 3.

FIG. 3 shows an assignment of memory locations in a shared memory processor-to-processor mailbox in opposing directions as between two processors, including the example of dynamic allocation of buffer space between the two ends of the shared memory to the second processor, in accordance with the principles of a first embodiment of the present invention.

In particular, in FIG. 3, not only is all of the dynamically allocated space 42 allocated to the DSP for passing a data payload to the MPU, but a portion of the fixed command space 40 (e.g., the third through eighth command reservations 183–188) are also used for passage of the lengthy information from the first processor (e.g., DSP) to the second processor (e.g., MPU).

As shown in FIGS. 2 and 3, as one side of the processor-to-processor mailbox 100 requires additional data space, it not only uses the previously unused dynamic space but it can be allocated some of its own command header space 40, 44. In this way, as memory is allocated to one side of the mailbox or the other, it remains contiguous with the rest of the mailbox buffer.

An interrupt service routine (ISR) may be used in either or both processors to read the messages from the respective side of the shared memory forming its incoming mailbox buffer. In accordance with the principles of the present invention, such an ISR would be capable of efficiently processing the transfer of information from the incoming mailbox buffer to internal RAM or other location, particularly since the transferred data would be in a contiguous portion of the shared memory. This allows a data transfer using a tight loop (possibly cached) to reduce time in the interrupt service routine (ISR).

Similarly, the ISR in a second processor (e.g., the DSP) can copy the internal ram buffer to the upside down buffer portion 44 in shared memory in "reverse" order so the rest of the code would simply fill the RAM buffer "right side up". The first processor (e.g., the MPU) can reverse the order of the shared memory as it copies it into internal RAM, and the remainder of the code of the MPU would process the RAM data as if it were "right side up".

Using this method of data transfer, each processor having access to the DPRAM would have to request (or demand) access to the shared memory, e.g., forming a dynamic mailbox space. This can be performed, e.g., using a command/response sequence limited to certain locations in the DPRAM, e.g., called mailbox command space.

One possible implementation is for one processor, say the DSP, to have access to the dynamic mailbox space. The only way the MPU would be allowed to write to it is if the MPU requested write access to it (e.g., via a command passed to the DSP, via an input/output (I/O) pin, via an interrupt to DSP, etc.) and its request for write access was granted by the DSP.

Once the MPU has completed its write access to memory space ordinarily utilized by the DSP, it can send a command to the DSP indicating that it is relinquishing control of the shared mailbox space.

Sharing of memory locations in opposing order as described provides many advantages. For instance, in a telephone answering device application, it can allow use of a maximum amount of memory space for both voice data stored from a DSP and call related information such as Caller ID stored from a MPU. In this way, data is less likely to be inefficiently split up over multiple memory blocks.

Moreover, in the telephone answering device (TAD) application, the opposing storage of data in a shared memory space allows a TAD to maximize playback speech frames in one direction, and to maximize record speech frames in the other direction, providing an efficiently managed record/playback memory space.

Furthermore, the speed of interrupt service routines (ISRs) can be reduced, saving energy and processor speed requirements. Overall, the principles of the present invention has the potential to almost double the possible throughput from one processor to another with very little overhead.

While the invention has been described with reference to the exemplary embodiments thereof, those skilled in the art will be able to make various modifications to the described embodiments of the invention without departing from the true spirit and scope of the invention.

What is claimed is:

1. A shared memory processor-to-processor mailbox between at least two processors, comprising:
   a shared memory accessible by a first processor and a second processor, said shared memory including a first mailbox portion to pass data from said first processor to said second processor, and a second mailbox portion to pass data from said second processor to said first processor, said first mailbox portion and said second mailbox portion both being defined at least in part over common memory addresses;
   said first mailbox portion starting at a low physical address end of said shared memory, and addressably filling upward through to a highest physical address of said common memory;
   said second mailbox portion starting at said high physical address end of said shared memory, and addressably filling downward through to said lowest physical address of said common memory;
   said first processor having write access to said first mailbox portion and not to said second mailbox portion;
   said first processor has read access from both said first mailbox portion and said second mailbox portion while having write access to said first mailbox portion and not to said second mailbox portion; and
   said second processor has read access from both said first mailbox portion and said second mailbox portion while having write access to said second mailbox portion and not to said first mailbox portion.

2. The shared memory processor-to-processor mailbox between at least two processors according to claim 1, wherein:
   said second processor has write access to said second mailbox portion and not said first mailbox portion.

3. The shared memory processor-to-processor mailbox between at least two processors according to claim 1, wherein:
   said first processor has read access to said first mailbox portion and to said second mailbox portion.

4. The shared memory processor-to-processor mailbox between at least two processors according to claim 3, wherein:
   said second processor has read access to said first mailbox portion and to said second mailbox portion.

5. The shared memory processor-to-processor mailbox between at least two processors according to claim 1, wherein:
   said shared memory is a dual port random access memory.

6. A method of utilizing a shared memory as a mailbox between two processors, comprising:
   providing a contiguous block of shared memory;
   allocating first direction messages passed from a first processor to a second processor to a first physical address end of said shared memory;
   allocating second direction messages passed from said second processor to said first processor to a second physical address end of said shared memory opposite said first physical address end;
   allowing said first direction messages to utilize a dynamically allocated shared central portion of said shared memory addressably filling through to said second physical address end;
   allowing said second direction messages to utilize said dynamically allocated shared central portion of said shared memory addressably filling through to said first physical address end;
   allowing said first processor read access from both said first direction messages and said second direction messages while having write access to said first direction messages and not to said second direction messages; and
   allowing said second processor read access from both said first direction messages and said second direction messages while having write access to said second direction messages and not to said first direction messages.

7. The method of utilizing a shared memory as a mailbox between two processors according to claim 6, further comprising:
   assigning a minimum length to said first physical address end.

8. The method of utilizing a shared memory as a mailbox between two processors according to claim 7, further comprising:
   assigning a minimum length to said second physical address end.

9. The method of utilizing a shared memory as a mailbox between two processors according to claim 6, further comprising:
   reallocating a portion of a minimum length of said first physical address end of said shared memory to enlarge a size of said dynamically allocated central portion utilized by said first processor.

10. The method of utilizing a shared memory as a mailbox between two processors according to claim 9, further comprising:
    reallocating a portion of a minimum length of said second physical address end of said shared memory to enlarge a size of said dynamically allocated central portion utilized by said second processor.

11. Apparatus for utilizing a shared memory as a mailbox between two processors, comprising:
    shared memory means for providing a contiguous block of shared memory;
    means for allocating first direction messages passed from a first processor to a second processor to a first physical address end of said shared memory;
    means for allocating second direction messages passed from said second processor to said first processor to a second physical address end of said shared memory opposite said first physical address end;
    means for allowing said first direction messages to utilize a dynamically allocated shared central portion of said shared memory addressably filling through to said second physical address end;

means for allowing said second direction messages to utilize said dynamically allocated shared central portion of said shared memory addressably filling through to said first physical address end means for allowing said first processor read access from both said first direction messages and said second direction messages while having write access to said first direction messages and not to said second direction messages; and means for allowing said second processor read access from both said first direction messages and said second direction messages while having write access to said second direction messages and not to said first direction messages.

12. The apparatus for utilizing a shared memory as a mailbox between two processors according to claim 11, further comprising:

means for assigning a minimum length to said first physical address end.

13. The apparatus for utilizing a shared memory as a mailbox between two processors according to claim 12, further comprising:

means for assigning a minimum length to said second physical address end.

14. The apparatus for utilizing a shared memory as a mailbox between two processors according to claim 12, further comprising:

reallocating a portion of a minimum length of said first physical address end of said shared memory to enlarge a size of said dynamically allocated central portion utilized by said first processor.

15. The apparatus for utilizing a shared memory as a mailbox between two processors according to claim 14, further comprising:

means for reallocating a portion of a minimum length of said second physical address end of said shared memory to enlarge a size of said dynamically allocated central portion utilized by said second processor.

* * * * *